July 14, 1959 W. R. BLISS 2,895,121
READ-OUT APPARATUS FOR MOVABLE INDICATING MECHANISMS
Filed Oct. 7, 1954 4 Sheets-Sheet 1

INVENTOR.
William R. Bliss
BY
ATTORNEYS

July 14, 1959

W. R. BLISS 2,895,121

READ-OUT APPARATUS FOR MOVABLE INDICATING MECHANISMS

Filed Oct. 7, 1954

INVENTOR.
William R. Bliss

BY

ATTORNEYS

July 14, 1959  W. R. BLISS  2,895,121
READ-OUT APPARATUS FOR MOVABLE INDICATING MECHANISMS
Filed Oct. 7, 1954  4 Sheets-Sheet 4

INVENTOR.
William R. Bliss
BY
ATTORNEYS

United States Patent Office 2,895,121
Patented July 14, 1959

2,895,121

READ-OUT APPARATUS FOR MOVABLE INDICATING MECHANISMS

William R. Bliss, Denver, Colo., assignor, by mesne assignments, to Van Norman Industries, Inc., New York, N.Y.

Application October 7, 1954, Serial No. 460,948

8 Claims. (Cl. 340—147)

This invention relates to apparatus such as calculating machines and registers which have movable indicating members and particularly to apparatus for transmitting an indication of the positions of the movable indicating members of such devices. This application is related to application, Serial No. 436,185, filed June 11, 1954, for Calculating and Recording Apparatus in the name of Edwin P. Davis, the assignee of the present application; the present application covers specifically read-out devices which may be employed in the apparatus disclosed and claimed in said Davis application.

Calculating machines and registers of various types are commonly provided with movable elements such as number wheels for indicating the results of calculation or other information. In calculating machines, the indicators are positioned automatically by operation of the machine and in some registers and other mechanisms, the indicating members may be moved manually to register or retain the desired information. In some applications, for example, in the system described and claimed in the aforesaid Davis application, it is desirable to transfer the information appearing on the movable indicating elements to some other apparatus such as, for example, a card punch machine. In order to facilitate the transfer of the information and to insure accuracy, it is desirable to provide a simple and reliable mechanism for reading out the information appearing on the indicators and for transmitting the information for recording or other purposes. Accordingly, it is an object of this invention to provide an approved read-out mechanism for calculating machines, registers and the like, which shall be of simple construction and reliable and accurate in operation.

It is another object of this invention to provide an improved electrical device for testing the positions of the movable indicating elements of calculating machines, registers, and the like, and for producing signals corresponding to the positions of such elements.

It is a further object of this invention to provide a read-out mechanism for producing signals corresponding to the positions of movable indicating members of calculating machines, registers and the like and including an improved and positively acting electric switch actuating device.

It is a still further object of this invention to provide a read-out mechanism for providing signals corresponding to the position of movable elements and including an improved electrical switching and circuit arrangement for decoding information obtained mechanically in accordance wtih the positions of the movable indicators.

Further objects and advantages of this invention will become apparent as the description proceeds and the features of novelty which characterize the invention will be pointed out with particularity in the claims annexed to and forming a part of this specification.

Briefly, in carrying out the objects of this invention in one embodiment thereof, an information read-out mechanism is provided which includes cam wheels mounted adjacent the movable indicating wheels of the calculating machine with which the mechanism is to be applied and rotated in synchronism with the indicating wheels. Each of the cam wheels is provided with cam surfaces so coded that for each position of the indicator, the corresponding position of the cam will provide a different coded arrangement. Associated with each cam wheel is a switch assembly including a plurality of switches and operating fingers arranged to be brought into arrangement with the cam, certain of the fingers effecting actuation of their corresponding switches according to the position of the cam. The switches are connected electrically to actuate a set of decoding relays. The decoding relays are arranged to actuate switches in a bridge network in which are arranged actuating coils for relays, each of which transmits a signal corresponding to a predetermined position of the indicating wheel. The arrangement of the decoding relays is such that upon actuation of a combination of the relays corresponding to the set of positions on the cam, a single signal producing relay will be energized. The selection of a single signal producing relay is accomplished by connecting the relay actuating coils in bridge circuits and actuating the control switches of the circuits so that only a single coil will be energized sufficiently to actuate its corresponding signal transmitting switch.

For a better understanding of the invention, reference may be had to the accompanying drawings in which.

Figure 1:
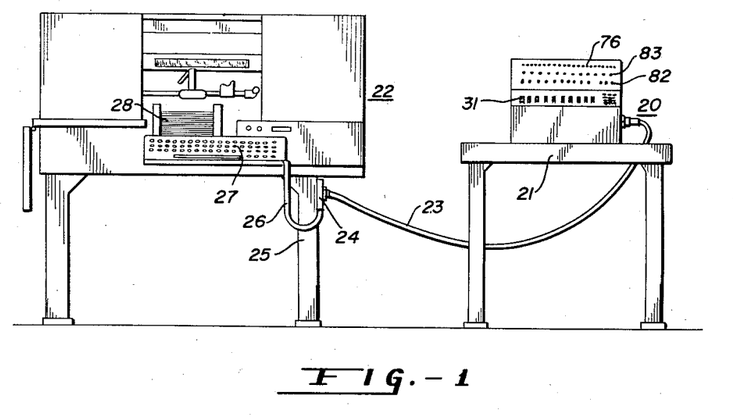
Fig. 1 is a front elevation view of a card punch machine and calculating machine including a read-out mechanism embodying this invention.

Referring now to the drawings, the calculating and recording apparatus shown in Fig. 1 comprises a calculating and transmitting machine 20 supported on a table 21 arranged near a punch card machine 22 to which it is connected by a signal transmitting cable 23; the cable 23 is plugged into a board 24 on the stand 25 of the punch card machine and which, in turn, is connected through a detachable cable 26 to the connection board (not shown) mounted within the machine in the usual manner. The machine 20 includes a calculating machine having a plurality of numeral wheels on which the result is obtained and is visible through windows in the casing in the usual manner. The machine 20 includes an electrical testing mechanism for determining the position of each of the wheels in order, and for producing electrical signals corresponding to the positions of the wheels and transmitting these signals to the punch card machine so that the result of the calculation on the machine 20 may be coded on a punched card.

The machine 22 may be operated in the usual manner by its keyboard indicated at 27. The blank punch cards are stacked in a holder in front of the machine, as indicated at 28, and are fed into the machine, punched and discharged at the rear. The machine may also be operated by signals transmitted through the cable 23 from the machine 20 and thus it is possible to supply information to the card punch machine from either its keyboard or from the machine 20. For the purpose of recording results obtained by operation of the calculating machine, only one operator is required, and the machine 22 may be located remotely from the calculating machine 20, provided the cable 23 is of sufficient length. The operation of the system is such that after a calculation has been performed on the machine 20, it is merely necessary for the operator to press a button on the machine 20 to cause the signal device within the machine to operate through a cycle and transmit the results of the calculation directly to the card punch machine.

By way of example, the invention has been illustrated and is described in connection with specific types of calculating machines and card punch machines. It will readily be apparent, however, that the invention is applicable to a wide range of calculating machines and other devices having one or more movable indicating devices such as numeral wheels; furthermore, it is obvious that the invention may be employed with various types of card punch or other forms of recording machines. The calculating machine illustrated and described is of the well known controlled key drive type exemplified in U.S. patent specification Number 1,110,734, issued September 15, 1914, to Kurt Ziehm. The card punch machine illustrated and described is of the type disclosed in U.S. patent specification Number 2,124,178, issued July 19, 1938, to W. W. Lasker.

The general system for reading out the positions of the movable indicating elements and for forming signals corresponding to their positions and transmitting the signals for actuation of the card punch machine, or other recording device, is the invention of Edwin P. Davis and is claimed in the aforesaid Davis application; the present invention, which is disclosed but not claimed in the aforesaid application, relates to details of improved mechanical readout elements and electric circuit connections for detecting and decoding the signal information and the claims of this application are directed to the features of these devices.

Figure 2:
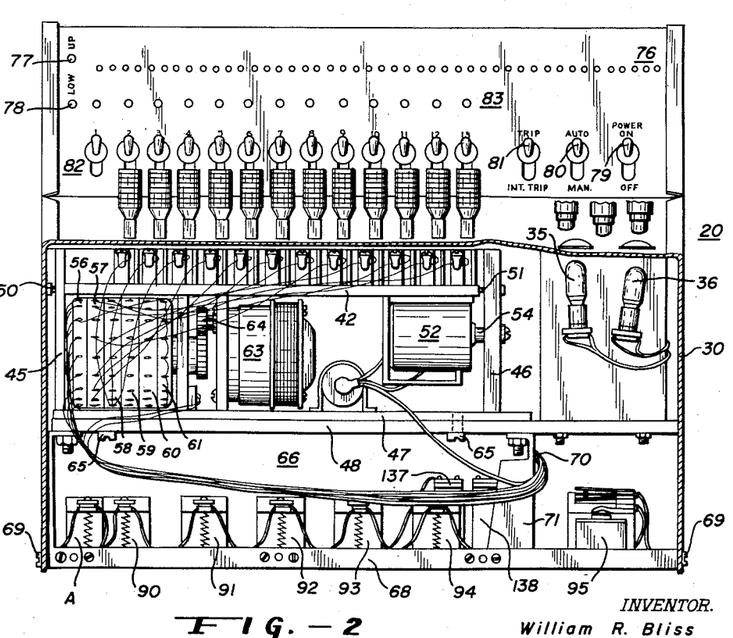
Fig. 2 is an enlarged front elevation view of the calculating or read-out machine shown in Fig. 1 with the cover partly broken away to show the actuating elements of the read-out mechanism.
Figure 3:
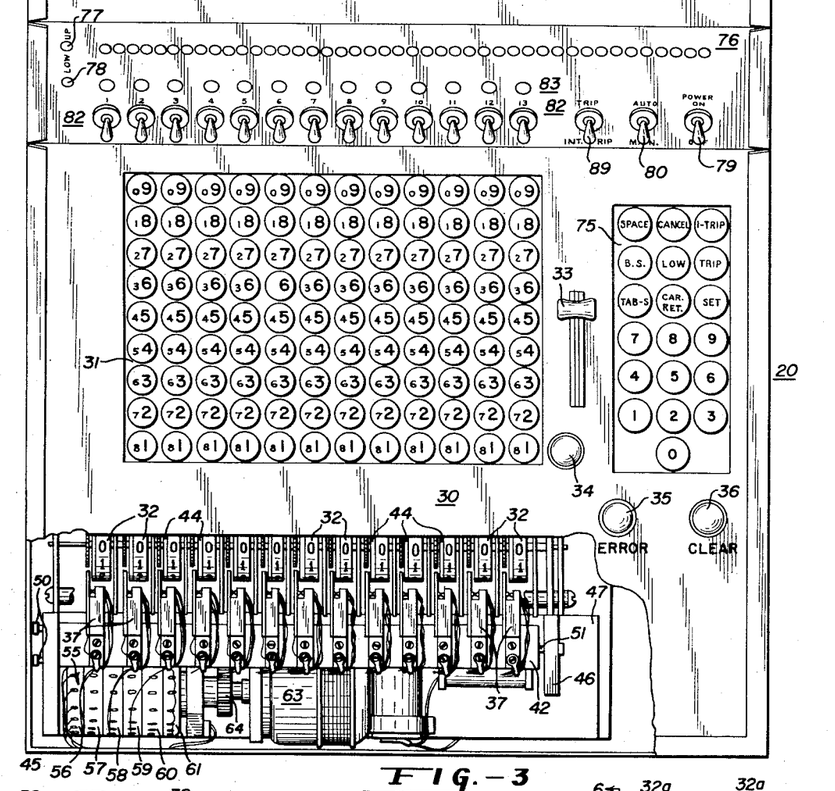
Fig. 3 is an enlarged top elevation view of the calculating machine with the forward portion broken away to show the read-out mechanism.

The calculating and signal transmitting machine 20, as shown in Figs. 2 and 3, is provided with a case 30 within which is arranged a calculating machine having a keyboard 31 provided with 12 columns of keys and a series of 13 numeral wheels 32 arranged in the forward portion of the calculating machine as shown in Fig. 3. In the cutaway portion of the casing 30, and therefore not shown on the drawing, there is provided a series of openings through which the top numerals of the indicator wheels are visible so that the result appears in these openings. The calculating machine is provided with the usual cancelling lever, indicated at 33, and a release or unlocking button 34 which must be actuated after an error has been corrected before the cancelling lever 33 can again be operated. Red and green signal lights 35 and 36 are provided in order to indicate the condition of operation of the calculating machine; when an error has occurred, resulting in the locking of the lever 33, a switch (not shown) is actuated and the red light 35 is lighted; at all other times, when the machine is in condition for operation, the switch is in its normal position and the clear green light 36 is lighted.

Figures 4, 5, 6, 7, 8, 9:
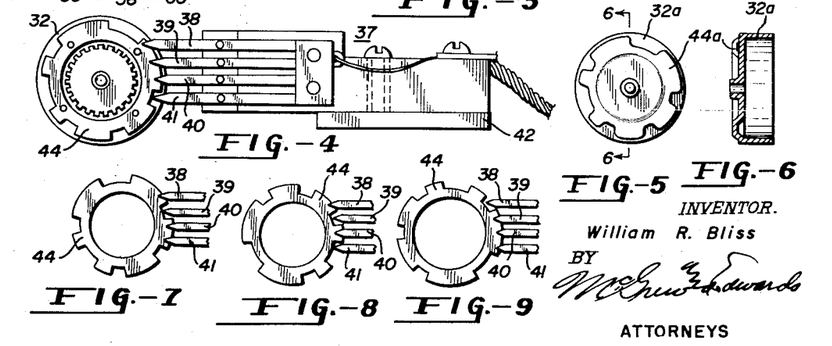
Fig. 4 is an enlarged detailed view of one of the cam and switch actuators of the mechanism of Fig. 3.
Figs. 5 and 6 are side elevation and sectional views, respectively, of a modified form of cam element.
Figs. 7, 8 and 9 are views of the cam element and operating fingers of the device in Fig. 4 shown in three different positions.

An electrical testing mechanism is provided within the casing 30 in order to determine the positions of the 13 wheels 32 and supply information for transmission to a signal interpreting device. This mechanism includes a mechanically operated read-out device mounted within the case 30 in front of the calculating machine and includes a series of 13 switch assemblies 37, each assembly being positioned adjacent a corresponding one of the numeral wheels 32. As shown in Fig. 4, each of the switch assemblies 37 includes four actuating fingers 38, 39, 40 and 41. All of the switch assemblies 37 are mounted on a longitudinal base or bar 42 normally biased to its left hand position and may be moved in unison to the right toward the numeral wheels 32 and against cams 44, one of which is secured adjacent each of the numeral wheels 32 and rotates therewith. The mounting support for the longitudinally movable bar 42 includes end members 45 and 46 mounted on a base 47 which, in turn, is secured to a horizontal plate or partition member 48 within the casing 30. The bar 42 is carried by the end members 45 and 46 on a pair of slide members or lugs 50 at the left end which are slidable in the support 45 and have heads limiting their movement therethrough and a similar single slide member 51 at the right end which is slidable in the support 46. The bar 42 is normally urged to the left against the support 45 by action of a spring (not shown) which is mounted within a solenoid assembly 52 secured to the lower side of the bar 42 near the right end thereof. The solenoid assembly includes a coil 53 and an armature mounted on the support 46. When the coil 53 is energized, the assembly, including the bar 42 and the coil 52, is drawn toward the support 46 and all of the fingers of the switch assemblies 37 are pressed into position against the cams 44. When the coil 53 is de-energized, the bar 42 returns to its position against the end support 45.

In order to operate the card punch machine 22, it is necessary to supply signals at spaced intervals; after each signal has been received by the punch machine 22, a card punch is set up and the machine is moved forward automatically to its next position. The successive reading out of the positions of the numeral wheels 32 is accomplished by a selector switch assembly 55 including a set of six rotary switches 56, 57, 58, 59, 60 and 61. Rotary selector arms within the assembly 55 are driven by an electric motor 63 through a gearing 64. The operation of the six rotary switches energizes each of the switch assemblies 37, in turn, to transmit their respective signals to decoding relays which provide the signals corresponding to the wheel positions for transmission to the recording or card punch machine. The manner in which this decoding and transmitting operation is accomplished will be described in detail in connection with the circuit diagram Fig. 10.

The switch assembly 55 and motor 63 are supported on the base 47 of the read-out assembly, and the entire assembly may easily be removed for servicing or replacement by removing a plurality of machine screws 65 securing the base 47 to the plate 48. The member 48 provides a support for the calculating machine and also provides a compartment 66 between the bottom of the case and the support in which compartment are arranged relays and other circuit components of the apparatus. The cover 30 is attached to a main base 68 by a plurality of screws 69, and may be removed after removing the screws and detaching the knob of the cancelling lever 33. The electrical conductors to the read-out assembly are included in a cable assembly attached to a plug 70 which may be removed to detach the elements of the read-out assembly from the electrical components in the base of the machine. The plug 70 enters a receptacle (not shown) which is mounted on one of the supporting members 71 which carry the main partition and supporting plate 48 in spaced relationship to the main base number 68, the remaining members not being shown in the drawing. When the cover is off and after the electrical connection has been detached and the screws 65 removed, the read-out assembly may be drawn forward from its position so that the fingers 38, 39, 40 and 41 of the switch assemblies 37 are drawn away from their positions between the numeral wheels 32. When replacing the assembly, the fingers of the switch assemblies 37 are first inserted between the proper ones of the wheels 32 and then the base 47 is positioned on the plate 48 and the screws 65 replaced, thereby locking the read-out assembly in correct alignment for operation.

In addition to the calculating machine and its controls, the calculating and transmitting apparatus 20 includes a manual control panel 75 having ten buttons for transmitting signals corresponding to zero and the nine digits and nine buttons which may be employed for controlling the various functions of the punch card machine and for actuating the read-out mechanism of the device 20. These latter nine buttons, as indicated, include the space control, a cancel control, a back spacer, a tabulation spacer, and a carriage return button in addition to the punch set control, a trip control for effecting operation of the punching machine, and an intermediate trip control for effecting operation of the punch machine followed by return of the punch machine carriage to an intermediate position; the cancel control restores the punch card machine to its initial operating position with all the punches withdrawn from set positions. The "low" control button is for selection of the lower position of the two ranges of position of the punch card machine, there being, for example, in the Remington No. 3 machine two rows each of forty-five punch or column positions. In the rear and upwardly extending portion of the casing 30, there is provided a series of forty-five signal lights 76 and two signal lights 77 and 78 to indicate that the punch card machine is in its upper and lower column positions, respectively. When the "low" button control button is punched, the upper signal light 77 is de-energized and the lower light 78 is energized to indicate that any results transmitted from the machine 20 will appear in the low column position of the punch card machine. Three toggle switches 79, 80 and 81 are provided on the right-hand side of the upper rear portion of the cabinet 30 and control the functions of the machine. The switch 79 is the electric power control having a lower "off" position and an upper "on" position. The switch 80 is the control for selecting either manual or automatic operation of the machine 20; in the manual position it is necessary to first set the punches of the punch card machine by operation of the "set" button, and thereafter to operate a trip button to effect the punching operation; in the automatic position, the complete operation of setting of the punches and punching is effected upon operation of the set button. Switch 81 controls the machine to select either the main trip operation or an intermediate trip operation. The functions of these switches will be better understood in connection with the description of the wiring diagram Fig. 10. In addition, there is provided a row of switches 82, numbered from 1 to 13, and a corresponding row of signal lights 83. These switches 82 select the numeral wheels from which information is to be read out during any one operation, and the corresponding signal lights indicate those wheels which are to be energized. No information is transmitted from numeral wheels of the machine when the corresponding switch 82 is in its "off" position.

From the foregoing it will be now be apparent that the keyboards and controls of the machine 20 make it possible to transmit to the punch card machine 22 both the results of calculations made on the keyboard 31 and appearing on the numeral wheels 32 and direct numerals from the keyboard 75. The keyboard 75 corresponds to the manual keyboard of the punch machine 22 and enables the operator to insert information directly without requiring that it be first set up at the punch machine 22 or on the indicator wheels 32. Each successive signal transmitted by the machine 20 to the machine 22 sets up the punches of the machine 22 in accordance with the signals transmitted. For example, identifying information may be first set up by operation of numeral keys of the keyboard 75 and thereafter calculations made on the keyboard 31 and these calculations transmitted to the punch card machine following the information from the keyboard 75. The columns of the keyboard 31 which are to be employed in the calculations are first selected by operation of corresponding ones of the switches 82 so that the results of calculations transmitted to the machine 22 are those from the columns selected by the switches 82, no signals being transmitted from columns other than those selected.

During the read-out operations, signals will be transmitted from each numeral wheel 32 in turn, the signal for each numeral being a different combination of open and closed positions of the four switches controlled by the fingers 38, 39, 40, and 41. The cams 44 of all thirteen wheels are identical and each cam is provided with six raised portions separated by openings or notches. The raised portions and notches are of dimensions and spacings such that for the ten positions of the wheel corresponding to the ten numerals, there will be ten corresponding different combinations of positions for the four switch fingers. Each of the numerals on the wheels 32 is spaced thirty-six degrees from the numerals on either side and for each thirty-six degree position of the cams 44, there is a different combination of the four control fingers. When the switches are moved to the right as viewed in Figs. 2 and 3, the finger assemblies are pressed axially against the cam wheels and the fingers strike the cam surface when a raised portion of the cam is opposite the finger position; those fingers which strike the cam surface act to hold their corresponding switch contacts open, the raised portions of the cam surface acting as stops, while those fingers which are opposite notches or openings in the cam are not affected and their corresponding switch contacts remain closed. The numeral at the top of the wheel 32 is the numeral visible to the operator and represents the position of the wheel. The wheel 32 in Fig. 4 is in position for zero. Counterclockwise rotation of the wheels 32, as viewed in Fig. 4, bring the successive digits from one to nine and then zero to the top position in order and each thirty-six degree movement of the cam surfaces thus produces a different set of positions of the fingers 38, 39, 40, and 41 of each cam assembly. The open and closed positions of the switches operated by the control fingers thus provide a coded indication of the positions of the numeral wheels 32.

The configuration and arrangement of the cams for securing the coded indication of wheel positions may be provided in any suitable manner which makes it possible to open and close the four control switches to provide the necessary coded information. Furthermore, the numeral wheels and coded cams may be constructed in any suitable manner and, for example, as shown in Figs. 5 and 6, the numeral wheel and cam surfaces may be pressed from a single piece of metal; in these views the numeral wheel is indicated at 32a and the raised cam surfaces at 44a.

The particular signal and coding arrangement may be selected to suit the requirements of the application in which the read-out mechanism is to be employed and the four switch coded arrangement is disclosed by way of example and to illustrate a preferred form of the invention. In the present example, the cam 44 is formed to provide coded positions of the fingers 38, 39, 40, and 41 for zero and the digits from one to nine according to the following table in which the position of each set of switch contacts is indicated as E (engaged) or NE (not engaged);

TABLE I

|    | 0  | 1  | 2  | 3  | 4  | 5  | 6  | 7  | 8  | 9  |
|----|----|----|----|----|----|----|----|----|----|----|
| 38 | NE | NE | NE | E  | NE | NE | E  | E  | NE | E  |
| 39 | NE | E  | NE | NE | E  | E  | NE | NE | NE | E  |
| 40 | NE | NE | E  | NE | NE | E  | E  | NE | E  | NE |
| 41 | E  | NE | NE | E  | E  | NE | NE | NE | E  | NE |

In order to provide further examples of the manner in which the cam wheel 44 is positioned for other settings than the zero position of Fig. 4, there are illustrated in Figs. 7, 8 and 9, the positions of the cam 44 for the numerals one, four, and seven, respectively. By reference to Table I above, it will be seen that the positions of the fingers 38, 39, 40, and 41 in these three figures correspond to the positions indicated on the table; in Fig. 7 the finger 39 falls in a notch corresponding to the energized position indicated under the numeral one in the table, in a similar manner, fingers 39 and 41 fall in notches in Fig. 8 to form the code for the numeral four, and finger 38 falls in a notch in Fig. 9 to form the code for the numeral seven. The remaining positions of the cam 44 representing the numerals two, three, five, six, eight, and nine, are each in positions thirty-six degrees out of phase with one of the four positions illustrated. For example, the numeral nine is thirty-six degrees in clockwise rotation from the position shown in Fig. 4, and the numerals six and eight are thirty-six degrees on either side of the position shown in Fig. 9. Thus, if the wheel 44, as shown in Fig. 4, is rotated clockwise thirty-six degrees, the two fingers 38 and 39 will fall in the large notch above the wheel, as shown in the figure, and the fingers 40 and 41 will strike the raised portion of the cam, thus providing the signal for the numeral nine. If the wheel 44, as shown in Fig. 9, is rotated thirty-six degrees in the clockwise direction, the notch opposite the finger 38 in Fig. 9 will move down to a position opposite the finger 40 and finger 38 will fall in the next notch while the fingers 39 and 41 strike the raised cam portions, thereby providing the coded signal for the numeral six. If the wheel 44 is rotated thirty-six degrees counterclockwise from the position of Fig. 9, the fingers 40 and 41 will fall in the notch next below their position, as shown in Fig. 9, and the fingers 38 and 39 will strike the raised cam surface, thus providing the coded signal for the numeral eight. The coded signals for the numerals two, three, and five are obtained in a similar manner by rotation of the cams, as shown in Figs. 7 and 8 to adjacent thirty-six degree positions.

Figure 10:
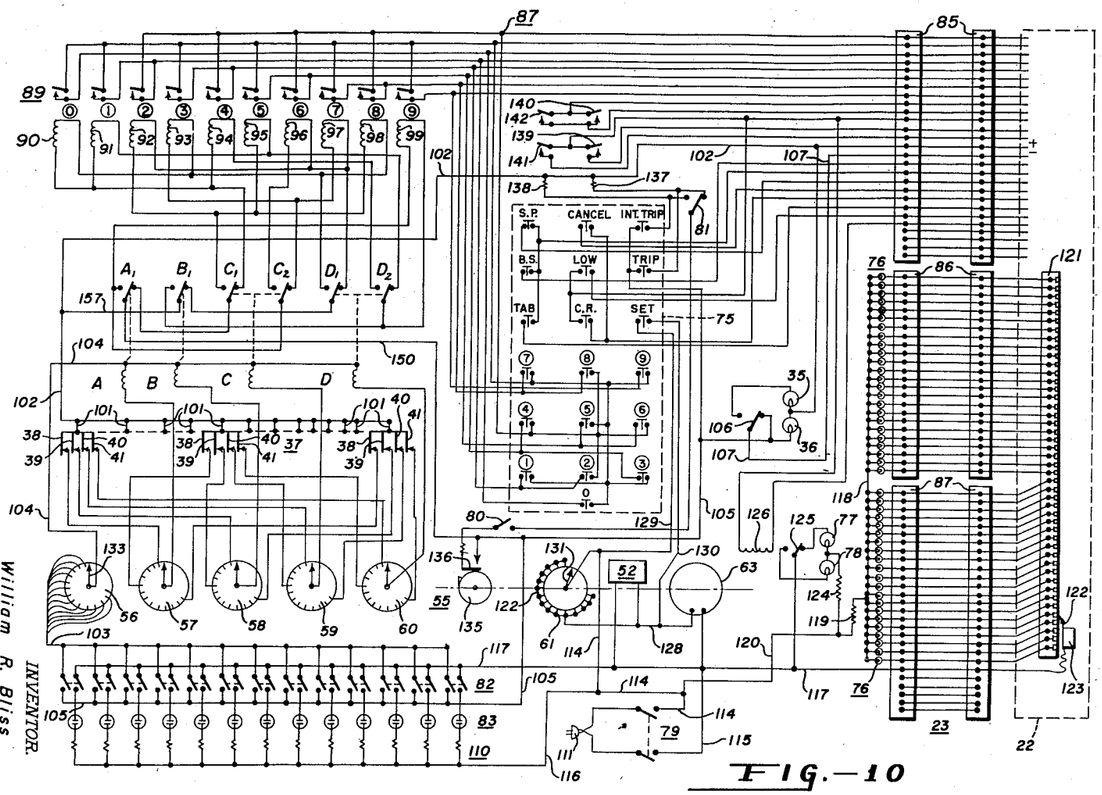
Fig. 10 is a wiring diagram of the electrical connections of the read-out mechanism.

A more complete understanding of the operation of the system and the relationship of the several components of the control and the manner in which they operate may be had from a consideration of Fig. 10, which is a schematic wiring diagram of the control system. As shown in Fig. 10, the punch card machine 22, indicated by a dotted rectangle, is connected by three pairs of plug connectors 85, 86 and 87 to the circuits of the signal forming device and auxiliary controls which comprise the components shown to the left of the plug connectors. Each of the pairs of plug connectors comprises two separable members, the two adjacent members as viewed in Fig. 10 being connected by the conductors of the cable 23 and the other members being secured to the machines 20 and 22, respectively. Three pairs of plug connectors have been employed as a matter of convenience and in practice, the three sets of conductors from the three left-hand members of the pairs of plug connectors may be carried in a single cable sheath 23, as indicated. The eight conductors or leads at the top of the diagram, and which are connected to the eight top terminals of the upper pair of plug connectors 85 and to eight terminals forming a diagonal line indicated at 88, comprise the signal carrying conductors of the calculating and recording system. In the illustrated embodiment, these conductors are arranged to carry coded signals in accordance with the code employed in the Remington No. 3 key punch machine. The ten digit keys on the panel 75 are connected to the terminals 88 to effect operation of the key punch machine manually in the same manner as may be done by operating corresponding keys at the machine itself, it being understood that the eight conductors are connected to the punch machine terminal board to effect this operation. Signals corresponding to zero and the nine digits are obtained by connecting either the top or next to the top terminal 87 to a selected one of the remaining six terminals. Thus, the zero signal is obtained by connecting the second and third terminals, numeral one by connecting the second and fourth terminals, numeral two by connecting the first and second terminals, numeral three by connecting the first and fifth terminals, and so on. The automatic operation of the machine as described heretofore is secured by energization of a series of ten relays indicated generally at 89 and arranged to be actuated by coils 90, 91, 92, 93, 94, 95, 96, 97, 98, and 99; the relays in the order of the coil numbers just given represent the numerals from zero through nine and have further been designated by their respective numerals in circles, which represent the digits corresponding to the individual relays. The relays 89 are energized by operation of a series of four decoding relays having operating coils A, B, C, and D. The decoding relays are energized by operation of the rotary switch 55 which tests in turn the positions of the thirteen switch assemblies indicated generally at 37, each of which is connected to a corresponding one of thirteen conductors 101 all connected to a common lead 102; this common lead is connected to the positive direct current power terminal of the key punch machine 22 through a corresponding individual conductor in the cable 23. The individual switches actuated by the fingers 38, 39, 40, and 41 of the switch assemblies 37 are connected to the conductors 101 and three of the switch assemblies 37 have been indicated diagrammatically, these being the assemblies for the first, fifth, and thirteenth switch assemblies. The details of the remaining switch assemblies 37 have been omitted in order to avoid unnecessary complication of the drawing.

The switch assemblies 37 are connected to the rotary switch 55 successively in order so that the signals representing the position of each of the numeral wheels of the calculating machine may be transmitted in turn to the decoding relays A, B, C, and D. The rotary switch 55 includes the two individual selector switch elements 56 and 61 at either end of the assembly and the four intermediate elements 57, 58, 59 and 60 all mounted for rotation on the same shaft by operation of the motor 63. Each of the selector switches includes a circular stationary member having twenty equally spaced contact points and a rotatable arm mounted on the common shaft and arranged to engage each of the twenty points in turn as it rotates through 360°. Except for the selector 61, only thirteen of the contacts are employed, these contacts corresponding to the thirteen numeral wheels and switch assemblies of the calculator. The thirteen contacts of the switch 56 are connected in order to the left-hand terminals of the thirteen switches 82 through a thirteen conductor cable 103. The rotating arm of the switch 56 is connected through a lead 104 to the upper terminals of the coils A, B, C, and D. Thus it will be seen that as the switch 56 is rotated, the relays will be connected successively to the thirteen switches 82. Each of the switches 82 is a double pole single throw switch, the left-hand pole of the switch connecting the conductor 103 and a conductor 105 which is connected to the negative side of the direct current supply line through a switch 106 and a conductor 107. The right-hand pole of the switches 82 connects the corresponding signal light 83 across the supply line from the power switch 79 in series with individual resistors 110. When the power switch is closed, it connects the power plug indicated at 111 to supply lines 114 and 115 and the resistors 110 are connected to the lead 114 by a common line 116. The other side of the circuit for the lights 83 may be traced from the lower pole of the switch 79 through the line 115 and a conductor 117 to the right-hand poles of all the switches 82.

One side of all the signal lights 76 is connected to a common conductor 118 and through a resistance 119 and conductor 120 to the line 114 on the upper side of the switch 79. The other terminals of the lights 76 are connected respectively to corresponding terminals on the left-hand members of the two plug receptacles 86 and 87, twenty-four of the connections being shown made to the receptacle 86 and the remainder to the receptacle 87. These connections are carried through the plug connectors 86 and 87 to forty-five contact elements on a contact bar or commutator 121 which is mounted in any suitable position adjacent the carriage of the card punch machine 22. A movable contact member 122 is mounted on a block 123 attached to the carriage of the machine 22 and arranged to move along the contact bar 121 upon movement of the carriage; the spacing of the contacts on the bar 121 is such that each contact element corresponds to a position of the carriage and when the carriage is advanced one position, the switch 122 makes contact with the next corresponding contact on the bar 121. The moving contact 122 is connected to the lead 117 and thence through the connection 115 to the lower side of the switch 79. It will now be apparent that when the power switch 79 is closed, a circuit is completed through the moving contact 122 and one of the contacts of the bar 121 and thence through the plug connector 86 or 87 to a corresponding one of the lights 76 which is thereby connected across the supply terminals and is lighted to indicate the position of the carriage. The upper and lower column signal lights 77 and 78 are also connected across the supply lines, their circuit including a resistance 124 connected to the lead 120 and a switch 125 connected to the line 117, the position of the switch 125 depending upon the energization of a relay coil 126. The switch 125 is normally in its right-hand position as shown so that the up-position light 77 is energized; the relay coil 126 is energized when the "low" position button on the control panel 75 is pressed or when the corresponding control is actuated on the punch card machine and the relay coil 125 is energized through a circuit completed within the punch card machine to the coil 125 through connections made by the plug connector 85. The structural arrangements and circuit connections within the punch card machine 22 have not been illustrated in the drawings as they are not essential to an understanding of the present invention. Furthermore, except for the direct current supply lines 102 and 107, individual numerals have not been applied to designate the connections between the control buttons of the panel 75 and the plug connector 85, the connections as shown being indicative of the connection arrangement of the Remington No. 3 machine referred to above.

The motor 63 is connected to be energized when the set button on the control panel 75 is pressed, whereupon the supply line 114 from the upper pole of the power switch 79 is connected to the left-hand motor lead indicated at 128 through the "set" button and conductors 129 and 130. The motor is thus energized by being connected between the supply lines 114 and 115, and the solenoid 52 is also energized the same way. As soon as the motor starts rotating, it rotates the common shaft of the selector switches 56 to 61, inclusive, and the rotating arm of the switch 61, indicated at 131, will make contact with the uppermost switch element which is connected to the line 128 through a connector 132 which is common to the first fifteen of the elements of the switch 61. As soon as this contact is made, the set button may be released, the motor supply connection being maintained by the switch 61. All of the arms of the disks of the selector switch 65 are rotated in a counterclockwise direction as viewed in Fig. 10. The topmost contacts of all of the switches, except the switch 61, are open. This assures closing of the motor circuit by the switch 61 before any contacts are made by the remaining switch elements; thus, no signals may be transmitted from any of the switch elements 57, 58, 59 and 60 until the motor circuit has closed to assure operation through a complete cycle. If the topmost contactor of the selector switches is considered the first contact, the second contact of the switch 56 is connected to the switch 82 corresponding to the first column of the calculating machine. This provides a connection from the left-hand pole of the first switch 82 through the rotating arm of the switch 56 indicated at 133 and thence through the connector 104 to the four coils A, B, C, and D; if the left-hand pole of the first switch 82 is closed, the connection is made from the arm 133 through the cable 103 and the switch 82 to the conductor 105 and thence to the negative side of the direct current supply through the switch 106 and the lead 107. The second contacts of the selector switches 57, 58, 59, and 60 are connected to the four switches of the first switch assembly 37 actuated by the four fingers 38, 39, 40, and 41 of the first assembly 37 at the left-hand end of the row of assemblies illustrated. Energization of the solenoid 52 has moved all the fingers of the switch assemblies into engagement position with the several cams 44 of the numeral wheel assemblies. Thus, each of the thirteen wheels is in either the zero position if it has not been employed in the calculation, or in zero or some other position corresponding to the results of the calculation, it being understood that those switch assemblies not employed in the calculation will be cut out by the opening of the corresponding switches 82. The four switches of each assembly 37 will then be in open or closed positions as represented by Table I above. The relays A, B, C, and D will be energized or not energized depending upon the positions of the four switches 38, 39, 40, and 41 of the first assembly 37. The actuation of the relays A, B, C, and D will determine the positions of their several switches indicated at $A_1$, $B_1$, $C_1$, $C_2$, $D_1$, and $D_2$, each of the switches actuated by the relays C and D having two poles. On operation of the relay switches, only one of the digit relays 89 will be energized and will close its corresponding switch to transmit a signal through the lines 88 to the card punch machine. When the circuits are broken by the advance of the selectors toward their third contact position, the machine carriage will then advance another position and be ready for the next signal which will be transmitted as soon as the arms of the switch assembly 55 move to engage their third contact to check the position of the second cam of the thirteen cams 44. As the contact arms of the switch assembly 55 continue to rotate, each of the thirteen cam positions will be checked in turn and signals transmitted from the digit relays to the punch card machine 22 in order. As soon as the arms of the switch elements 56, 57, 58, 59, and 60 have rotated away from their last contact, all of the circuits to these elements will be open. However, the switch 61 will continue closed for one more position; this assures rotation of the motor to clear all of the contacts. The shaft will then stop with the rotating arms in some position between the fourteenth and first contacts, this being the open or unconnected position between the fifteenth and first terminals of the switch 61, the actual stopping position being determined merely by the distance which the motor coasts after it is de-energized.

In addition to the switch assembly 55, there is connected on the same shaft a cam 135 which is arranged to actuate a switch 136 as soon as the selector swtiches have completed a cycle; the switch 136 is provided to effect the automatic operation of the trip and intermediate trip controls. If the switch 80 is moved to its automatic position, that is to its closed position, the switch 136 is connected to the switch 31 which energizes either a relay 137 or a relay 138, depending upon its position and thereby effects operation of the trip and intermediate trip contacts, respectively. The trip contacts are indicated at 139 and 140 and the intermediate trip contacts at 141 and 142, these being actuated by the trip coil 137 and intermediate trip coil 138, respectively. It will be noted that the switch 136 is connected in parallel with either the trip or intermediate trip switches, depending upon the position of the switch 81 to effect the same operation of the punch machine as that obtained through pressing of the trip and intermediate trip buttons.

The decoding and signal forming circuits

From the circuit diagram, Fig. 10, it will be noted that the four selector switches 57, 58, 59 and 60 are arranged so that they connect the switches 38, 39, 40, and 41, respectively in circuit with the relay coils A, B, C, and D, respectively. Thus, each time the rotating arms of the switches engage a set of four of the contacts connected to the switch assembly 37, one or more of the coils A, B, C, and D will be energized depending upon the condition of the particular switch assembly 37. The contacts $A_1$, $B_1$, $C_1$, $C_2$, $D_1$, and $D_2$ are biased normally to their right-hand positions as indicated in the drawing. These switches and the signal relay coils 89 are connected in a main bridge circuit and in sub-bridge circuits in a manner such that upon operation of the selected ones of the decoding relays A, B, C, and D, one and only one of the signal coils 90 to 99, inclusive, will be energized to actuate its corresponding switch and transmit a signal to the recording or punch card machine. In order that the connection of the bridge circuits may more readily be understood they have been illustrated in conventional bridge pattern in Figs. 11 through 14 inclusive.

Figure 11:
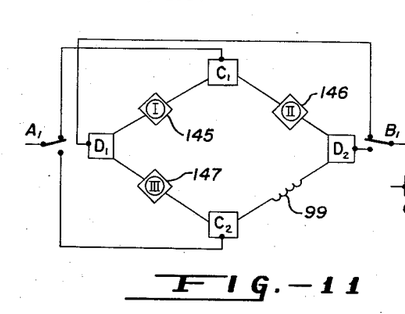
Figs. 11, 12, 13 and 14 are diagrammatic views of portions of the electrical circuit arranged to show the bridge connections.

In Fig. 11 the switches $C_1$, $C_2$, $D_1$, and $D_2$ have been illustrated in block form connected at the four corners of the main bridge in which are arranged three sub-bridges numbered 145, 146, and 147. In Fig. 11 the bridges 145, 146 and 147 have been indicated in block form and their circuit connections are shown in detail in Figs. 12, 13 and 14, respectively.

The switches $A_1$ and $B_1$ are the primary selecting switches which determine the points of application of power to the main bridge. As shown in Fig. 10, the blade of switch $A_1$ is connected by a conductor 150 to the supply line 105 and thence to the negative side of the direct current supply of the machine 22; the blade of the switch $B_1$ is connected by a conductor 157 to the supply line 102 and thence to the positive side of the direct current supply. It will be noted that by a combination of positions of the switches $A_1$ and $B_1$, power may be supplied across any selected arm of the main bridge. In the bridge diagrams of Figs. 11 to 14 all of the switches have been shown in their same positions as in Fig. 10, these being the positions to which they are biased and remain unless their corresponding coils A, B, C, and D are energized. When all of the switches are in this normal or neutral position, power is supplied across the arm of the main bridge containing the sub-bridge 145 and on reference to Fig. 12, it will be noted that with this connection, all three coils 90, 92, and 98 are connected in series across the power supply; this connection energizes the coils but since they are in series, there is not sufficient voltage in any one coil to cause operation of its corresponding switch and hence no signal is transmitted from these coils. In addition to the coils 90, 92, and 98, this neutral connection also connects the bridge 146, the coil 99 and the bridge 147 in series across the line. On reference to Figs. 13 and 14, it will be noted that this connection results in connecting the coils 91, 97 and 99 in series across the power supply and in parallel with the coils of the bridge 145. Insufficient voltage is applied across any of these three coils in series to effect their operation and hence no signal is transmitted from the apparatus when the switches are in their neutral positions.

During the operation of the decoding apparatus when the motor 63 rotates the arms of the switch assembly 55, each of the thirteen switch assemblies 37 will be tested in turn and the coils A, B, C, and D will be energized in accordance with the code set forth in Table I above. From the table it will be seen that the coils A and B will not be energized when the numeral wheel is in its position for zero and the numbers two and eight, thus the switches $A_1$ and $B_1$ for these positions of the wheels will be as shown in Fig. 11. For the numeral nine, both the coils A and B are energized and the switches $A_1$ and $B_1$ will move to their lower positions thereby connecting the coil 99 directly across the power supply to energize this coil and transmit a signal for the numeral 9. When the numeral wheel is in the position for the numbers three, six and seven, the coil A is energized while the coil B remains de-energized and as a result, the switch $A_1$ moves to its lower position thereby connecting the bridge 147 across the power supply. When the numeral wheel is in its position for the numbers one, four, and five, the coil B is energized while the coil A remains de-energized and as a result, the switch $B_1$ moves to its lower position, thereby connecting the bridge 146 across the direct current supply circuit. The remaining connections of the table are determined by the position of the fingers 40 and 41 result in actuation of the switches $C_1$, $C_2$, $D_1$, and $D_2$ and control the connections of the coils within the sub-bridges of Figs. 12, 13, and 14. In the sub-bridges as illustrated, it will be noted that the switches $C_1$ and $D_1$ have been shown as five terminal switches, terminals employed in these switches in Figs. 13 and 14 being those indicated as not connected in Fig. 12. It will be noted that these terminals are, in fact, common terminals of their respective switches $C_1$ and $D_1$ and are shown as separate terminals merely for purposes of clear illustration of the bridge circuits. Each of the sub-bridges is similar to the main bridge of Fig. 11 and the switches $C_1$, $C_2$, $D_1$, and $D_2$ in the individual bridges of Figs. 12, 13 and 14 operate to select the arm of the sub-bridge across which the full voltage is to be applied in the same manner as the arms of the main bridge are selected by operation of the switches $A_1$ and $B_1$ in Fig. 11.

Figure 12:
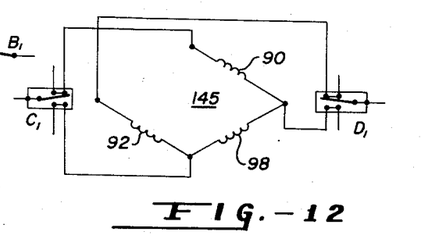

When the switches $A_1$ and $B_1$ remain in their positions as in Fig. 11 and the numeral wheel is in its zero position, the coil D is energized and the switch $D_1$, as shown in Fig. 12, moves to its lower position. This connects the coil 90 directly across the line and the zero signal is transmitted. It will be appreciated, of course, that the bridges 146 and 147 and the coil 99 are also in circuit in parallel with the coil 90; however, the resistance of these elements is so high that none of the other coils are energized sufficiently to actuate their corresponding switches. If the numeral wheel is in the position for the digit two, the coil C will be energized and the coil D de-energized and the switch $C_1$ will move to its lower position, thereby connecting the coil 92 across the line between the switches $C_1$ and $D_1$, thereby energizing the coil 92 and transmitting the signal for the numeral two. When both the coils C and D are energized, the two switches $C_1$ and $D_1$ will be in their lower position; this is the position for transmitting the signal for the numeral eight, the coil 98 being connected directly across the line between the two switches $C_1$ and $D_1$. These three positions for energization of the coils 90, 92 and 98 are the only three positions for energizing signal transmitting coils when the coils A and B are de-energized and the switches $A_1$ and $B_1$ are in their upper position as shown in Fig. 11.

Figure 13:
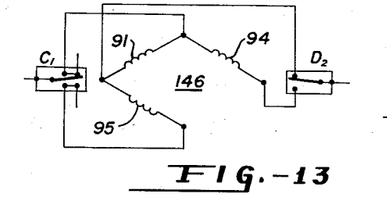

When the coil A is de-energized and the coil B is energized, the switch $B_1$ moves to its lower position and energizes the bridge 146 shown in Fig. 13. Here again there are three positions for energizing the three coils 91, 94 and 95 representing the numerals one, four and five. In the position of the switches of the bridge 146 as shown in Fig. 13, the coil 91 is connected directly across the line and is energized to transmit the numeral one signal. When the coil C is de-energized and the coil D energized, the switch $D_2$ moves to its lower position and the coil 94 is energized to transmit the signal for the number four. When the coil C is energized and the coil D not energized, the switch $C_1$ moves to its lower position, thereby connecting the coil 95 across the direct current supply and transmitting the signal for the number five.

Figure 14:
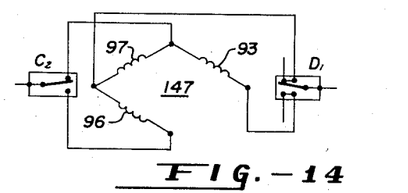

When the coil A is energized and the coil B not energized, the switch $A_1$ moves to its lower position and connects the bridge 147 shown in Fig. 14 across the line, making it possible to transmit signals corresponding to the numerals three, six, and seven. When the coil C is not energized, and the coil D is energized, the switch $D_1$ moves to its lower position, thereby connecting the coil 93 for the number three in circuit to transmit the corresponding signal. When the coil C is energized and the coil D not energized, the switch $C_2$ moves to its lower position, thereby connecting the coil 96 in the circuit and transmitting the signal for the number six. When both the coils C and D are not energized, the switches remain in their position as shown in Fig. 14 and transmit the signal corresponding to the number seven by energization of the coil 97.

From the foregoing, it is evident that whenever the coils A, B, C, and D are energized in accordance with any of the combinations of positions of the switches 38, 39, 40, and 41 indicated on Table I, that only a single coil of the group of coils from 90 to 99 inclusive will be energized and cause actuation of its corresponding switch to transmit a signal to the punch card machine. It will be obvious that in the event that additional coils were desired, another bridge similar to the bridges of Figs. 12, 13, and 14 could be inserted in the main bridge of Fig. 11 instead of the single coil 99. A simple and effective decoding and signal-forming circuit arrangement has thus been provided for testing the positions of the numeral wheels and transmitting a signal corresponding to the position of each wheel in turn.

Signals can be transmitted from the numeral wheels only when they are in correct positions representing numerals and should one or more of the wheels stop in a position intermediate its indicating position, the cancelling lever lock-out mechanism will be actuated and at the same time, the switch 106 will be thrown to its left-hand position, thereby lighting the red light 35 instead of the green light 36. Furthermore, the movement of the switch 106 to its left-hand position opens the connection between the negative side of the supply line through the conductor 107 to the supply conductor 105 and prevents energization of the decoding and signal-forming circuits by interrupting the connection to the left-hand poles of the switches 82 and thus opening the circuits of the coils A, B, C, and D and also the connection to the pole of the switch $A_1$ which prevents energizing any of the coils 90 through 99 inclusive.

Operation

For purposes of illustrating the operation of the apparatus described, including this embodiment of the invention, assume that a group of cards is to be punched which includes a series of transactions all related to the same account. First the permanent decimal points of the calculating machine, over which the operation is to be conducted, are selected by closing the corresponding ones of the column switches 82. Assuming, by way of example, that the first to fifth switches inclusive, and the ninth to thirteenth inclusive are closed, then no signals will be transmitted corresponding to the position of the number wheels of the sixth, seventh and eighth columns of the calculating machine keyboard 31. Because certain of the information is to be the same for all of the cards in the group, the trip switch 81 will be moved to its intermediate trip position, that is, to its left-hand position as shown in Fig. 10. And the switch 80 will be moved to its manual, or open position. The power supply switch 79 may now be turned to its up or "power on" position and the signal lights will be lighted to show first that the carriage of the punch card or recording machine is in its extreme left-hand position, and that the first to fifth and ninth to thirteenth columns have been activated. The signal light 36 will be lighted to indicate that the machine is clear and ready for operation. Digit buttons of the control panel 75 can now be operated to supply the permanent information to be set up on the punches which will be retained for subsequent operations by the operation of the intermediate trip control. This permanent information, or rather, information common to all cards of the group to be punched may, for example, include the date, a number designating the vendor involved in the account, and the account number. After this information has been set up, the signal light in the row of lights 76 will indicate the advance position of the carriage. For purposes of example, let us assume that the carriage has advanced to the fourteenth column so that the fourteenth signal light in the row 76 is lighted. Now, assuming that there are four items under which calculations are to be made by operation of the calculating machine, and that the results are such that they can be calculated on the two sets of columns previously selected, the machine may now be operated and the calculations will appear on the numeral wheels under the first to fifth and ninth to thirteenth columns, these calculations representing the first two of the four items. The operator may now press the set button and the results of these calculations will be set up in the punches on the punch card machine. The indicating wheels may now be cleared by operation of the cancelling lever 33, and a second set of two calculations performed in the same manner and set up in the same manner as that for the first set. Should there be further information, such as additional code numbers, the corresponding numerals may be punched on the auxiliary board 75 and will be added as further items following the calculations previously set up. By now pressing the intermediate trip key, all the information as set up will be punched on the card, and the machine will be returned to its position at the fourteenth column with the punches representing the preliminary information remaining set up, while all others are cleared. The carriage of the punch card machine will now have been advanced 20 positions to the 34th column as will be indicated by the lighting of the 34th light in the row of lights 75. The machine may again be cleared by operation of the cancelling lever 33.

Should the tabulating operation be such that it is desired to punch the card after a single operation of the machine, for example, switches 80 and 81 may be set in their automatic and intermediate positions respectively; then, after the calculations have been performed, the operator may press the set button which will result in setting up the punches and then punching the card without requiring further attention by the operator. Because the switch 81 is set on intermediate trip, the carriage will be returned to the intermediate trip stop and be ready for another set of calculations; it being understood, of course, that the cancelling lever 33 is employed to clear the calculating machine each time after a punching operation.

Embodiment of Figs. 15 to 18 inclusive

Figures 15, 16, 17, 18:
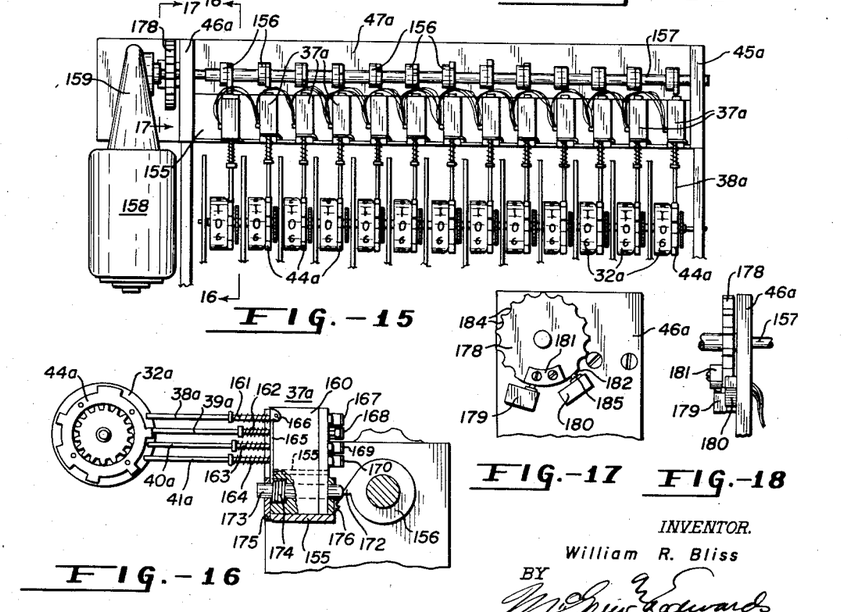
Fig. 15 is a plan view of a modified form of cam and read-out assembly.
Fig. 16 is an enlarged detail view of one of the cam and finger assemblies of the device of Fig. 15.
Fig. 17 is a detailed view along the lines 17—17 of Fig. 15.
Fig. 18 is an end elevation of the elements shown in Fig. 17.

In Fig. 15 there is illustrated another embodiment of the testing mechanism for positioning the four switches of the decoding control. The functions of the parts of this device are similar to those of the first embodiment and corresponding parts have been designated by the same numerals with the addition of the suffix letter "*a*."

In this embodiment, a series of 13 switch assemblies 37*a* is mounted on an elongated carrier 155 which is secured between vertical end supports 45*a* and 46*a* which are mounted on a longitudinal supporting member 47*a*.

The switch assemblies 37a include sets of four fingers extending directly toward cams 44a mounted on a common shaft with the numeral wheels 32a of the calculating machine. Thirteen cams 156 are mounted on a common shaft 157 extending between the supports 45a and 46a and arranged to be driven by a motor 158 through a gearing (not shown) arranged within a housing 159, the motor and housing being secured by a suitable supporting element (not shown) so that they are carried by the supporting member 47a. The assembly, including the switch elements 37a, and the supports and motor and cam operator, provide a movable assembly similar to the movable assembly carrying the switch assemblies in the first embodiment. The cams 156 are arranged opposite respective ones of the switch assemblies 37a in a position such that when the actuating element of the cam comes into position it moves the entire switch assembly 37a forward so that the four fingers of the switch assembly are in operative engagement with the cams 44a. The cams 156 are arranged to move their respective assemblies 37a forward in turn and in order so that only one of the assemblies 37a is in testing position at a given time.

The details of construction of the switch assemblies are illustrated in Fig. 16 which is a view on the line 16—16 showing the left-hand switch assembly as viewed in Fig. 15. Each of the switch assemblies 37a comprises a block 160 in which are mounted the four testing fingers 38a, 39a, 40a and 41a which lie in the plane of the cam 44a and are urged toward the left-hand side by springs 161, 162, 163 and 164 respectively, compressed between the block 160 and stops on the fingers 38a, 39a, 40a and 41a. The blocks 160 are made of suitable insulating material, while the fingers are conducting and are all in conducting and sliding relationship with a common connector 165 mounted on the front of the block 160 and having a terminal 166 by which it may be connected in circuit with the controls. Secured to the block 160 on the side opposite that shown in Fig. 16 and extending over the rear of the block in spaced relationship with the rear of the fingers, are four stationary flexible switch members 167, 168, 169 and 170. It will now be apparent that when the fingers are pressed to the right a sufficient distance, they will engage respective ones of the switch elements 167 to 170 and make an electrical contact. In Fig. 16, the block 160 has been shown in its left-hand position to which it has been urged by operation of the cam 156, the actuating element 172 of which has been shown in engagement with a plunger guide 173 secured within the block 160. Block 160 is normally urged to the right by a compression spring 174 mounted in a recess in the front or left-hand end of the block about the guide member 173. The guide member moves longitudinally in recesses formed in side strips 175 and 176 secured to the front and back respectively of the support 155. The support 155 is machined with slots in which the blocks 162 slide, the depth of the slots being indicated at the right-hand edge of the block 160. The cam 44a has been illustrated as constructed so that when the fingers 38a, 39a, 40a and 41a are moved forward in the plane of the cam, certain of the fingers will strike radial projections on the cam. Those fingers which strike the projections will be stopped from further movement and, as a result, the movement to the left of block 160 will cause closing of the corresponding switches 167 to 170 inclusive. It will readily be apparent that the cam surface may be formed to provide a series of four coded signals in the same manner as the cam 44 of the first embodiment, there being six radially projecting portions separated by recesses or cut-away portions which allow the fingers to move forward without interruption and thereby retain their corresponding switches in open position.

At the left end of the shaft 157 between the supports 46a and the motor gearing 159 there is provided a notched cam member 178 which is shown in the enlarged views Figs. 17 and 18. This cam is provided to actuate two normally closed switches 179 and 180 arranged in the motor circuit and in the circuit of the switches 37a respectively. Switches 179 and 180 are shown in Fig. 17 in their open positions, the switch 179 being held open by a lug 181 attached to the cam 178 and the switch 180 being held open by a raised portion 182 of the cam 178. The periphery of the cam 178 is provided with thirteen notches 184 and whenever the actuating element of the switch 180, indicated at 185, falls into one of the notches, the switch returns to its normal closed position. The cam 178 is positioned so that whenever one of the actuating cams 156 is in position to move its respective switch assembly 37a to its forward position for testing the cam of the adjacent number wheel 32a, the switch 180 is closed. Thus, during the rotation of the shaft 157, each of the switch assemblies 37a in turn tests the position of its respective numeral wheel and a corresponding signal is transmitted to the signal decoding apparatus. The switch 179 is opened by engagement with the lug 181 after each of the thirteen positions have been tested by operation of the cams just described. The four leads for all thirteen switch assemblies are connected together so that only four leads need be carried from the switch assemblies to the control circuits, all the switches remaining open until their switch assembly is pressed into its testing position by operation of the corresponding cam 156. Thus, these four leads may be connected directly to the control coils A, B, C and D of the circuit diagram Fig. 10, the motor 158 and the cam 178 and switches 179 and 180 taking the place of the switch assembly 55. The operation of the system may thus be the same as that of the first embodiment. While the invention has been described in connection with a specific system employing a calculating machine and a punch card machine, other applications will readily be apparent to those skilled in the art. The readout mechanism including, for example, the switch assemblies 37 of the first embodiment may obviously be applied to various types of indicating mechanisms which are provided with movable indicating members, regardless of the method or mechanism employed for moving the indicating members.

Because various modifications and different applications of the invention will occur to those skilled in the art, it is not desired that the invention be limited to the specific construction as illustrated and described, and it is intended by the appended claims to cover all modifications and applications which fall within the spirit and scope of the invention.

I claim:

1. In a mechanism of the class described, a movable indicating element, a read-out means for producing a signal corresponding to the position of said element comprising a plurality of switches each movable between an open and a closed position, means dependent upon the position of said indicating element for establishing each of said switches in one of its positions to provide a combination of the positions of said switches corresponding to the position of said element, a plurality of electric actuating devices one for each of said switches, circuit means for connecting each switch with the corresponding one of said devices, means for energizing said circuit means to effect energization of said actuating devices in accordance with the positions of said switches, and means dependent upon energization of said circuit means for producing a different predetermined electric signal for each different combination of positions of said switches, said predetermined electric signal producing means comprising a master selector bridge-like circuit including four terminals connected in alternation, means for connecting a power supply across any arm of said master bridge-like circuit, a plurality of the arms of said bridge-like circuit including coils connected to form secondary bridge-like circuits each including four terminals connected in alternation and each constituting an arm of said master bridge, means for connecting any arm of said secondary bridge-like circuits directly to constitute the complete repective arms of said master bridge-like circuit whereby any one of said coils may be selected for operation.

2. In a mechanism of the class described, a movable indicating element, a read-out means for producing a signal corresponding to the position of said element element comprising a plurality of switches each movable between an open and a closed position, means dependent upon the position of said indicating element for establishing each of said switches in one of its positions to provide a combination of the positions of said switches corresponding to the position of said element, a plurality of electric actuating devices one for each of said switches, circuit means for connecting each switch with the corresponding one of said devices, means for energizing said circuit means to effect energization of said actuating devices in accordance with the positions of said switches, and means dependent upon energization of said circuit means for producing a different predetermined electric signal for each different combination of positions of said switches, said predetermined electric signal producing means comprising a bridge-like circuit having four arms and four terminals connected in alternation, switches operated by said actuating devices for connecting a power supply across any one of said arms, a plurality of relay coils connected in said arms, at least one of said arms having a plurality of said coils connected therein, and means including additional switches controlled by said actuating devices for selectively connecting the coils in all of said arms having a plurality of coils either individually or in series with one another whereby any one of the coils of said bridge-like circuit may be selected and operated by said actuating devices to the exclusion of the others of said coils.

3. In a mechanism of the class described having a movable indicating element and a read-out means as set forth in claim 2 wherein one arm of said bridge-like circuit has a single one of said relay coils connected therein and the other three arms of said bridge-like circuit each have three of said coils connected therein, whereby any one of ten relays may be selectively operated by said actuating devices, said ten coils corresponding to zero and the nine digits, and means dependent upon the actuation of each of said coils for producing a signal corresponding to the respective digit.

4. In a mechanism of the class described, at least a pair of rotatable indicating members, an electric testing device for each member for producing a signal depending upon the position of each member, each device comprising cam means movable with its member, a plurality of fingers engageable with and movable by the cam means and a plurality of switches operable to opened and closed position under the control of said fingers, an electrical actuating device for each switch, means for selectively and electrically scanning each testing device to determine the position of said fingers and the condition of said switches, circuit means including said scanning means for effecting energization of said actuating devices in accordance with the position of said switches, and means dependent upon energization of said circuit means for producing a different predetermined electric signal for each position of each member, said predetermined electric signal producing means comprising a bridge-like circuit including four terminals connected in alternation, relays having coils connected in the arms of said bridge-like circuit and switches arranged to be operated by said actuating devices to energize said bridge-like circuit and connect said coils in accordance with the energization of said actuating devices.

5. In a mechanism of the class described, a movable indicating element, a read-out means for producing a signal corresponding to the position of said element including a plurality of switches operable to opened and closed positions depending upon the position of said element, an electrical actuating device for each switch, circuit means for connecting each switch with the corresponding one of said devices, means for energizing said circuit means to effect energization of said actuating devices in accordance with the positions of said switches, and means for producing a different predetermined electric signal for each different position of the element, said predetermined electric signal producing means comprising bridge-like circuit including four terminals connected in alternation and having relay coils connected in the arms thereof and switches arranged to be operated by the actuating devices to energize said bridge-like circuit and connect the coils in accordance with the energization of said actuating devices.

6. Apparatus as defined in claim 5 wherein said bridge-like circuit consists of a master selector bridge, there being provided secondary bridge-like circuits in a plurality of its arms, each of the secondary bridge-like circuits including four terminals connected in alternation.

7. In a mechanism of the class described, at least a pair of rotatable indicating members, an electric testing device for each member for producing a signal depending upon the position of each member, each device comprising cam means movable with its member, a plurality of fingers engageable with and movable by the cam means and a plurality of switches operable to opened and closed position under the control of said fingers, an electrical actuating device for each switch, means for selectively and electrically scanning each testing device to determine the position of said fingers and the condition of said switches, circuit means including said scanning means for effecting energization of said actuating devices in accordance with the position of said switches, and means dependent upon energization of said circuit means for producing a different predetermined electric signal for each position of each member, said predetermined electric signal producing means comprising a master selector bridge-like circuit including four terminals connected in alternation, means for connecting a power supply across any arm of said master bridge-like circuit, a plurality of the arms of said bridge-like circuit including coils connected to form secondary bridge-like circuits each including four terminals connected in alternation and each constituting an arm of said master bridge-like circuit, means for connecting any arm of said secondary bridge-like circuits directly to constitute the complete respective arms of said master bridge-like circuit whereby any one of said coils may be selected for operation.

8. In a mechanism of the class described a read-out means wherein said predetermined electric signal producing means comprising a bridge-like circuit including four terminals connected in alternation, relays having coils connected in the arms of said bridge-like circuit and switches arranged to be operated by said actuating devices to energize said bridge-like circuit and connect said coils in accordance with the energization of said actuating devices, one arm of said bridge-like circuit having connected therein a plurality of said coils, two of said last mentioned switches being movable to predetermined positions for applying power across predetermined pairs of the corners of said bridge-like circuit to energize the respective arms of said bridge-like circuit and others of said last mentioned switches being arranged to effect predetermined connections of said plurality of relay coils in the said one arm of said bridge-like circuit.

References Cited in the file of this patent
UNITED STATES PATENTS

| | | |
|---|---|---|
| 1,664,539 | Bryce | Apr. 3, 1928 |
| 2,049,719 | Peirce et al. | Aug. 4, 1936 |
| 2,127,733 | Herbst | Aug. 23, 1938 |
| 2,302,769 | Haselton et al. | Nov. 24, 1942 |
| 2,480,981 | Thierfelder | Sept. 6, 1949 |
| 2,625,324 | Sundstrand | Jan. 13, 1953 |